United States Patent Office 2,782,240
Patented Feb. 19, 1957

2,782,240

ETHERS OF POLYOXYALKYLENE GLYCOLS

Robert E. Hefner and Malcolm E. Pruitt, Lake Jackson, Tex., assignors to The Dow Chemical Company, Midland, Mich., a corporation of Delaware No Drawing. Application November 21, 1952,
Serial No. 321,944

14 Claims. (Cl. 260—613)

This invention relates to an improved process for preparing mono- and diethers of polyoxyalkylene glycols.

Heretofore, monoethers of polyoxyalkylene glycols have usually been prepared by processes which comprise reacting an alkylene oxide with a monohydroxy compound, such as ethanol or phenol, in the presence of a small amount of a condensation catalyst, e. g. caustic alkali. The products of these processes are for the most part complex mixtures of monohydroxy polyoxyalkylene monoethers in which the length of the polyoxyalkylene chain varies considerably from one molecule to another in the mixture. In other words, a product of some particular average molecular weight, and hence of some particular viscosity, is actually a complex mixture of materials with a considerable spread between their individual molecular weights. Such mixtures normally contain a substantial proportion of material of molecular weight far below the average, and hence of high volatility. As a result, the mixtures tend to exhibit flammabilities which are undesirably high, i. e. they have too low flash points for effective use of the mixtures as specialized lubricants. In addition, these products may also contain significant amounts of both alkylene and polyoxyalkylene glycols which are unavoidably produced when the reactants contain water. Although this glycol formation can be reduced by carrying out the reaction under relatively moisture-free conditions, the products so produced still have the undesirably large molecular weight spreads which often seriously affect their properties and restrict their uses.

A new process has now been discovered for the production of improved mono- and diethers of polyoxyalkylene glycols which are characterized by extreme uniformity of chain length of the individual molecules thereof, i. e. by very low molecular weight spread. As a consequence of this high product uniformity, practically no low molecular weight ethers are formed and high yields of the desired polyoxyalkylene ethers result. The mono- and diethers of polyoxyalkylene glycols produced by the process of the present invention have considerably higher flash points than products of comparable viscosity prepared by the usual methods referred to above.

According to the process of the invention as hereinafter described, these improved mixtures of polyoxyalkylene glycol ethers may be prepared by reacting an essentially anhydrous 1,2-alkylene oxide, such as ethylene, propylene, or butylene oxide, with the alkali metal salt of a monohydroxy compound, e. g. sodium or potassium alcoholate or phenolate, until a polyoxyalkylene chain of the desired length has been obtained. Depending on whether the final product desired is a mono- or a diether of the polyoxyalkylene glycol, the alkali metal salt of the polyoxyalkylene glycol monoether formed by the reaction is either hydrolyzed e. g. neutralized, or reacted with an alkyl halide.

While the alkali metal salt of the monohydroxy compound may be supplied as such, it is preferably made in situ by starting with the monohydroxy compound itself, and first reacting all or nearly all of the hydroxyl content thereof with an alkali metal to form the alkali metal salt. When virtually all of the molecules of the monohydroxy compound are thus activated, e. g. with sodium, they grow more uniformly during the alkylene oxide reaction than if only a few monohydroxy molecules are initially activated. In this manner, salts of monoethers of monohydroxy polyoxyalkylene compounds are formed in which the polyoxyalkylene chains are of very uniform length.

Because of the exceptional quality of the salts of the monoethers so produced, they may be converted to diethers of high purity without the necessity for refining the monoethers which has heretofore been thought essential. Furthermore, since the monoethers of the polyoxyalkylene glycols as initially formed are present in the form of alkali metal salts, no chemical treatment is necessary in the preparation of diethers other than to react the alkali metal salt with an alkyl halide. Accordingly, the present invention provides a process of making diethers of polyoxyalkylene glycols which may be carried out without isolating any intermediate reaction products at any point from start to finish.

The substantially dry monohydroxy compounds which may be employed as starting materials in the process of the invention are either saturated aliphatic alcohols or phenols having from 1 to 20 carbon atoms and containing only carbon, hydrogen, and oxygen in the molecule, with no functional group other than the hydroxy group attached thereto. More preferably, however, the monohydroxy compounds have no more than 10 carbon atoms in the molecule. Most frequently, monohydroxy compounds having no more than 6 carbon atoms are employed. Ether groups, such as methoxy, ethoxy, propoxy, and butoxy, are non-functional groups which may be attached to the initial monohydroxy compound. Aldehyde, ketone, and acid groups are functional groups and are unsuitable substituents on the starting compounds as defined above. Among the monohydroxy aliphatic alcohols which may be employed in the instant process are alkanols and alkoxy alkanols, including both normal and branched chain alcohols, which may be primary, secondary, or tertiary in character. Suitable alkanols include methanol, ethanol, isopropanol, sec-butanol, n-hexanol, n-octanol, n-decanol, and alkoxy derivatives thereof. Typical phenols which may be employed are phenol, alkoxy phenols, alkyl phenols, etc. such as m-methoxy phenol, p-ethoxyphenol, o-cresol, p-ethylphenol, 2,4-dimethylphenol, p-isopropylphenol, p-sec-butylphenol, and 2,4-ditert-butylphenol.

The 1,2-alkylene oxides which may be used in making salts of monoethers of the above described monohydroxy compounds are the 1,2-epoxides of ethylene, propylene, and butylene. Mixtures of these 1,2-alkylene oxides may, if desired, be employed in the condensation reaction. When liquid polyoxyalkylene glycol mono- and diethers are desired end-products, the 1,2-epoxides of propylene or butylene are usually employed since the condensates of ethylene oxide are normally solid compositions above a molecular weight of approximately 800.

A relatively inert diluent is ordinarily employed as a common solvent both for the reactants as well as the etherified products of the reaction. Under the conditions of the reaction, the diluent should be relatively inert to the alkali metal, the alkylene oxide, and the monohydroxy compound, and also to the alkyl halide when the diether of the polyoxyalkylene glycol is to be prepared. Classified hereinafter as relatively inert diluents are those diluents which are essentially non-reactive toward all of the organic reactants but which may form metal organic compounds with an excess of the alkali metal remaining after essentially all of the hydroxy compound has been reacted e. g. with sodium. Typical diluents which are relatively inert in the process of the invention are such compounds as diisopropylether, dioxane, n-hexane, cyclohexane, benzene, and toluene. The preference of diluent for any given reaction depends somewhat on the identity of the reactants, although most any relatively inert diluent which is a mutual solvent for the reactants is satisfactory. The amount of diluent should in general be sufficient to dissolve and maintain most of the reactants, as well as the organic portion of the resultant product, in solution throughout the course of the reaction.

All steps of the present process are carried out under relatively moisture-free conditions and may be conducted batchwise or continuously as desired. In preparing the sodium salt of a monohydroxy compound in a batchwise process, the total charge of monohydroxy compound, sodium, and diluent may all be loaded into a suitable reaction vessel and reacted without any subsequent addition of reagents. Preferably, only the diluent and sodium are initially charged into the reaction vessel, the monohydroxy compound being added gradually throughout the course of the reaction. It may sometimes be more desirable to make the sodium salt of the monohydroxy compound in a continuous manner by gradually adding all three constituents simultaneously to the reaction vessel and continuously withdrawing the reaction product containing the sodium derivative of the organic hydroxy compound. Ordinarily, a sufficient amount of sodium is employed to react with most of the monohydroxy compound, and most desirably with substantially all of the monohydroxy compound. Based on the total monohydroxy compound employed in the reaction, greater than 0.8 of a molclular proportion, and more preferably, greater than 0.9 of a molecular proportion of sodium is generally used for every molecular proportion of the monohydroxy compound. Most preferably, approximately equimolecular proportions of sodium and the monohydroxy compound are usually employed. A large excess of sodium apparently has no worthwhile purpose and no improvements have been observed in the properties of the polyoxyalkylene monoethers so prepared. To the contrary, when the reaction is carried out with excess sodium in the presence of an aromatic hydrocarbon diluent, e. g. benzene or toluene, an aromatic impurity is formed which persists in the reaction product as a non-water soluble, non-filterable, difficultly-removable, white flocculent solid. The formation of this solid material has been observed when sodium in excess of 1.05 equivalent weights per equivalent weight of the monohydroxy compound has been employed in the presence of toluene as diluent. However, no such solid contaminant has ever been seen to form when carrying out the reaction in the presence of non-aromatic diluents, e. g. diisopropyl ether, n-hexane, and cyclohexane. When using less than an equivalent weight of sodium per equivalent weight of the monohydroxy compound, the advantageous properties of the polyoxyalkylene ethers prepared according to the invention grow progressively less apparent with less and less sodium.

The reaction of sodium and the monohydroxy compound is generally accomplished under conditions of good agitation, at a temperature which provides a satisfactory rate of reaction, and for a time sufficiently long to produce the desired degree of reaction. These conditions all depend somewhat on the identity and reactivity of the monohydroxy compound, e. g. ethanol is more reactive than n-butanol and the latter more reactive than n-hexanol, etc. Although a reaction temperature as low as −10° C. may sometimes be employed, most generally the salt is formed by heating the reactants, sometimes to a reaction temperature as high as 150° C. Most preferably, the reaction is carried out at a temperature in the range of about 100° to 120° C. It is frequently necessary, therefore, to operate under superatmospheric pressures up to 10 atmospheres in order to contain the lower boiling reactants at these elevated temperatures. Since hydrogen is given off by the hydroxy compound when sodium replaces the hydroxy hydrogen thereof, hydrogen gas is necessarily vented from the reaction vessel during the course of the reaction.

Upon obtaining the sodium salt of the monohydroxy compound, e. g. the sodium alcoholate or phenolate, it is reacted with a 1,2-alkylene oxide to form the sodium salt of the polyoxyalkylene monoether. Usually a solution of the sodium salt of the monohydroxy compound in an inert diluent is employed, e. g. the total reaction product from the preceding step. In carrying out this reaction with a 1,2-alkylene oxide in a batchwise manner, the solution of the sodium derivative of the monohydroxy compound in an inert diluent is initially charged into a suitable reaction vessel and heated to the desired reaction temperature in the range of 60° to 200° C. More desirably, the reaction is conducted at a reaction temperature in the range of 80° to 165° C. Even more frequently, a temperature of from 110° to 140° C., is employed. To this heated solution is gradually added the relatively moisture-free 1,2-alkylene oxide under conditions of good mixing until a sufficient amount has reacted with the monohydroxy compound to give a polyoxyalkylene ether chain having an average of at least five oxy-1,2-alkylene groups. Most desirably, at least 5 molecular proportions of one or more 1,2-alkylene oxides are introduced for each molecular proportion of the sodium derivative of the monohydroxy compound to form these improved ethers of polyoxyalkylene glycols. The alkylene oxides should be relatively pure and moisture-free. Their moisture content should be less than 0.1 percent and preferably less than 0.05 percent water by weight. For best results, a moisture content of less than 0.02 percent by weight is desirable. Likewise, the 1,2-alkylene oxides should be free, or relatively free, from contaminants such as aldehydes which give rise to side reactions and by-product formation.

The reaction with 1,2-alkylene oxides is conducted at pressures sufficiently great to contain the reactants at the temperature employed. For this purpose, pressures of less than 10 atmospheres are generally satisfactory, although higher pressures may be employed if desired. This reaction may also be carried out in a continuous manner by gradually adding the reactants (and inert solvent) to a reaction tube or vessel and continuously withdrawing the reaction product therefrom.

When the monoether of the polyoxyalkylene glycol is the desired end-product, the total reaction product containing the sodium salt of the polyoxyalkylene glycol mono-ether from the preceding step is neutralized, e. g. with anhydrous or aqueous HCl. In working up the resultant monoether, the organic product is separated from the salt or brine and subjected to distillation to remove the diluent and any low boiling material. Prior to the distillation step, the organic portion may if desired be washed with a suitable solvent to extract any impurities therefrom.

When however, a diether of the polyoxyalkylene glycol is desired as the final product, the reaction product containing the sodium salt of the polyoxyalkylene glycol mono-ether is reacted with an alkyl halide, e. g. an alkyl chloride. The reaction is most desirably carried out until substantially all of the sodium atoms attached to the polyoxyalkylene glycol compound have been reacted. The amount of alkyl halide used to form the diether is generally slightly in excess of one equivalent weight per equivalent weight of the sodium salt of the polyoxyalkylene glycol monoether. That is to say, greater than one molecular proportion of alkyl halide is employed per molecular proportion of the sodium salt of the monoether. This reaction is likewise carried out in the presence of an inert diluent as hereinbefore described. Usually the total reaction product from the 1,2-alkylene oxide condensation step is used per se, e. g. the solution of the sodium salt of the monoether in an inert diluent. It is frequently desirable to add more sodium to the total reaction product after monoetherification with the 1,2-alkylene oxide but prior to dietherification with alkyl halide. This subsequent addition of sodium insures diether formation by reacting with sodium any hydroxy groups which might be present, e. g. as a result of reacting less than one molecular proportion of sodium with one molecular proportion of the initial monohydroxy compound to form the sodium salt thereof. The dietherification reaction with an alkyl halide may be carried out batchwise by charging all of the reactants into a suitable reaction vessel. The reactants are desirably heated to a reaction temperature generally in the range of 60° to 160° C. for a time sufficiently long to attain the required degree of reaction. More frequently, a reaction temperature of from about 100° to 120° C. is employed. Upon completion of the reaction, the total reaction product is generally filtered to remove any insoluble matter, e. g. NaCl, and then subjected to distillation to remove any low boiling material, e. g. inert diluent or low boiling ethers.

The following examples illustrate the process of the invention. Unless otherwise specified, all runs were carried out in a steel vessel by reacting sodium with the monohydroxy compound in the presence of toluene as an inert diluent. These reactions were conducted under conditions of good mixing at a temperature of approximately 120° C. and under pressures of about 3 to 4 atmospheres. To maintain these pressures, hydrogen liberated by the reaction was continuously vented. Upon completion of the reaction between sodium and the monohydroxy compound as evidenced by the cessation of hydrogen evolution, the contents of the reaction vessel were heated to a temperature of approximately 140° C. and the 1,2-alkylene oxide introduced under a pressure of from 5 to 7 atmospheres until a monoether of the desired molecular weight was obtained. After introducing all of the 1,2-alkylene oxide into the reaction vessel, an additional relatively short digestion period was employed to insure completeness of the reaction. Subsequent treatment of the product to obtain a polyoxyalkylene glycol monoether is described in the specific examples which follow.

In preparing a diether from the sodium salt of the monoether of polyoxyalkylene compound, the total 1,2-alkylene oxide reaction product was first heated with excess sodium until no hydrogen was evolved. Then the resultant product was transferred to a suitable reaction vessel and excess gaseous methyl chloride was passed into the well-agitated reaction mixture heated to a temperature of from 100° to 110° C. and maintained at a pressure in the range of 4 to 7 atmospheres until reaction was complete. The reaction product so obtained was filtered hot to remove salt and finally subjected to distillation to remove toluene and light fractions at a temperature up to about 130° C. at a pressure of approximately 2 millimeters of mercury absolute.

*Example 1*

Polyoxypropylene glycol sec-butyl methyl ether was prepared in the manner hereinafter described. Into a steel reaction vessel was charged a total of 1000 milliliters toluene, 200 grams sec-butanol (2.7 mols), and 62.2 grams metallic sodium (2.7 mols) under relatively moisture-free conditions. The resultant relatively dry solution was well-agitated by means of mechanical stirring and heated to a temperature of about 110° C. during a period of three hours until essentially all of the alcohol and sodium had reacted to form the sodium sec-butoxide as evidenced by cessation in the evolution of hydrogen from the reaction vessel. Throughout most of the reaction, a pressure of about 40 p. s. i. g. was maintained. Thereafter, the temperature was raised to about 140° C. and 2000 grams (34.5 moles) of 1,2-propylene oxide containing less than 0.1 weight percent moisture was passed into the well-mixed sodium sec-butoxide solution maintained at a pressure of 100 p. s. i. g. The pressure was maintained at 100 p. s. i. g. until all of the 1,2-propylene oxide was added. After allowing 30 minutes digestion time, the temperature was lowered to about 110° C. and 270 grams (5.7 moles) of methyl chloride was passed into the reaction vessel. To insure the completeness of the reaction, the well-stirred reactants were digested for a period of four hours and filtered hot to remove sodium chloride. The polyoxypropylene glycol secondary butyl, methyl ether so prepared was subjected to vacuum distillation at 140° C. and 5 millimeters mercury absolute to remove toluene and light fractions. The purified diether was found to have the following properties:

Molecular weight (by acetylation) _____ 605
Viscosity at 100° F _____ centistokes ___ 12.77
Viscosity at 210° F _____ do ____ 3.59
Density at 25° C _____ .9591
Flash point _____ ° F __ 374
Percent volatility [1] _____ Less than .01
Percent hydroxyl (by acetylation) _____ .07
Percent ash _____ Less than .001
Percent acidity (as acetic acid) _____ .024
Percent water _____ .02

[1] Volume per cent material removed at 170° C. and 5 millimeters mercury absolute over a 15 minute time interval.

*Example 2*

Polyoxypropylene glycol sec-butyl methyl ether was prepared according to the general procedure described above. The runs were carried out in a steel reaction vessel by gradually adding sec-butanol to a well-agitated solution of sodium and toluene maintained at a temperature of 120° C. and a pressure in the range of 40 to 55 p. s. i. g. An equimolecular ratio of sodium to sec-butanol was employed in all three runs. The volume ratio of toluene to sec-butanol was about 4:1 except for the first run in which a volume ratio of about 3:1 was used. Hydrogen was vented off continuously as it was liberated. Upon completion of the reaction, the temperature was raised to 140° C. and 1,2-propylene oxide was gradually fed into the reactor until the desired amount had been added. The approximate mole ratio of 1,2-propylene oxide to sec-butanol for runs A, B, and C respectively was 8:1, 9:1, and 10:1. The total reaction product was then heated with excess sodium at 120° C. until no hydrogen was observed in the vent. Thereafter gaseous methyl chloride was gradually passed into the monoether-containing solution at a temperature of 110° C. until reaction was complete. The total reaction product was filtered hot to remove sodium chloride and toluene was separated from the product by flash distillation. Light fractions were removed by vacuum distillation at 150° to 160° C. at 5 millimeters mercury. Physical data for the product of each run are tabulated below:

| Physical data | Run A | Run B | Run C |
|---|---|---|---|
| Viscosity: | | | |
| −65° F _____ cks__ | 7,413 | 7,354 | 7,252 |
| −30° F _____ cks__ | 520 | 512 | 505 |
| 100° F _____ cks__ | 9.67 | 9.54 | 9.55 |
| 210° F _____ cks__ | 2.88 | 2.87 | 2.87 |
| Density (25° C.) | .9506 | .9496 | .9497 |
| Flash Point _____ °F__ | 363 | 367 | 365 |
| Percent Volatility [1] | .1 | .1 | .1 |
| Percent Hydroxyl | .05 | .13 | .13 |
| Percent Ash | .003 | .008 | .008 |
| Percent Acidity | .006 | .018 | .007 |
| Percent Water | .008 | .014 | .013 |

[1] Volume percent material removed at 170° C. and 5 millimeters' mercury absolute over a 15 minute time interval.

*Example 3*

Polyoxypropylene glycol butyl methyl ether was prepared according to the general procedure in the preceding example. An equimolecular ratio of sodium to n-butanol and volume ratio of toluene to n-butanol of about 4:1 were employed in preparing sodium n-butoxide. A mole ratio of 1,2-propylene oxide to n-butanol of 7.8 to 1 was also used. The following table contains the physical data for the purified product:

| Physical Data | Mono-ether | Diether |
|---|---|---|
| Viscosity: | | |
| 100° F_____cks__ | _____ | 7.40 |
| 210° F_____cks__ | 3.15 | 2.26 |
| Flash Point_____°F__ | _____ | 338 |

*Example 4*

To demonstrate the high product yields and relatively high flash points of the monoethers obtained by the process of the invention, the sec-butyl monoether of polyoxypropylene glycol was prepared according to the same general procedure employed in previous examples. As therein described, equimolecular proportions of sodium and sec-butanol were reacted in a solution of toluene in the following parts by weight:

100 parts sec-butanol
31.4 parts sodium
482 parts toluene
1090 parts 1,2-propylene oxide Essentially anhydrous 1,2-propylene oxide was then added to the total product from above until the desired amount had reacted with the sodium sec-butoxide contained therein to obtain salt of the polyoxypropylene glycol sec-butyl monoether. By neutralizing the hot sodium salt of the monoether with anhydrous HCl, the polyoxypropylene glycol sec-butyl monoether was obtained. It was subsequently filtered, and subjected to distillation to remove the light fractions boiling below 140° C. at 5 millimeters mercury absolute pressure. Based on the monoether so purified, the toluene-free light fractions removed by distillation amounted to 1.5 weight per cent. The formation of a relatively small amount of lower boiling material resulted in a relatively greater overall yield of the purified monoether, some of the physical properties of which are listed below:

Physical data:
   Viscosity—
      100° F_____cks__ 20.43
      210° F_____cks__ 4.35
   Flash point_____°F__ 415
   Percent hydroxyl_____ 2.81

Polyoxypropylene glycol sec-butyl monoether was also prepared by a method not in accord with the invention but similar to the general procedure outlined above. The 1,2-propylene oxide was reacted with sec-butanol which had previously been reacted with only a relatively small proportion of sodium. The parts by weight of these materials subjected to reaction is as follows:

100 parts sec-butanol
2.0 parts sodium
580 parts 1,2-propylene oxide

The resultant product was neutralized and stripped of light fractions boiling below 140° C. at 5 millimeters of mercury absolute pressure. The total light fractions so removed amounted to 13.1 weight percent of the purified monoether. The overall yield was considerably lower than in the previous run. Physical properties of the monoether are listed as follows:

Physical data:
   Viscosity—
      100° F_____cks__ 20.95
      210° F_____cks__ 4.52
   Flash point_____°F__ 375
   Percent hydroxyl_____ 2.97

From these physical properties, it is evident that the monoether prepared in accord with the invention and described in the first portion of this example has a considerably higher flash point in relation to its viscosity than that of the monoether not so prepared.

*Example 5*

To demonstrate the superior properties of the polyoxypropylene glycol sec-butyl methyl ethers prepared according to the process of the invention, several runs were carried out. Run A was conducted in accord with the invention using the general procedure hereinbefore described in Example 1. In this run, an equimolecular proportion of sec-butanol and sodium together with a sufficient amount of toluene to solubilize the reactants were all charged into the reaction vessel and reacted to completion at 110° C. Following the reaction of sodium and alcohol, 1,2-propylene oxide was added at a rapid rate until the desired amount had reacted. Thereafter, a representative sample of the total product was distilled at 130° C. under 2 millimeters mercury absolute pressure to remove toluene and any light fraction e. g. from the monoether. Among the data in the accompanying table is the percent by weight of the toluene-free light fraction based on the weight of the monoether remaining after the removal of all material boiling below 130° C. at 2 millimeters mercury absolute. The percentage of light fraction is exceptionally low in run A in which an equimolecular proportion of sodium to alcohol was employed in accord with the invention. The same general procedure used in the preceding examples was employed to prepare the diether, e. g. polyoxypropylene glycol sec-butyl methyl ether. This diether exhibited an exceedingly good flash point relative to its viscosity.

Runs B and C, not in accord with the invention, were carried out using the same general procedure employed in run A with the following exceptions. Only small ratios of sodium to alcohol were used in both runs B and C. In run C, no toluene was employed. The monoether of run C was first purified by distilling off all material boiling below 130° C. at 2 millimeters mercury absolute prior to preparing the diether therefrom.

The properties of all diethers listed in the accompanying table are for the purified materials after having been subjected to distillation up to 130° C. at 2 millimeters mercury absolute.

These runs illustrate that the improved properties and yields of the products of the invention are due to the high sodium to alcohol ratio and are apparently not affected by the use of toluene as a diluent.

| Run | A | B | C |
|---|---|---|---|
| Parts by weight of reactants: | | | |
|   Sec-butanol | 100 | 100 | 100 |
|   Sodium | 31 | 2.5 | 2.4 |
|   Toluene | 300 | 500 | None |
|   Propylene oxide | 1,060 | 725 | 700 |
| Weight Percent Light Fraction in Monoether [1] | 2.1 | 14.2 | 15 |
| Physical Properties of Purified Diether: | | | |
|   Viscosity at 210° F_____cks__ | 3.42 | 3.99 | 3.4 |
|   Flash Point_____°F__ | 379 | 356 | 350 |
|   Percent Hydroxyl_____ | .04 | .03 | .05 |

[1] Toluene-free light fraction removed from monoether by distillation at 130° C. and 2 millimeters mercury absolute.

*Example 6*

The following runs illustrate the use of several different relatively inert diluents in the preparation of polyoxypropylene glycol sec-butyl methyl ethers having comparable viscosities and flash points. These runs were carried out under very similar conditions according to the general procedure previously described by reacting an equimolecular proportion of sodium with sec-butanol in a solution of each of the diluents listed below. Thereafter, the resultant products were reacted with 1,2-propylene oxide in the desired proportions and finally with methyl chloride to give the diethers. The product data for the various runs, listed as to diluent, are contained in the following table.

| Diluent | Kinematic Viscosity of Diether at 210° F., cks. | Flash Point, ° F. | Wt. Percent Diether |
|---|---|---|---|
| Toluene | 3.51 | 381 | 91.6 |
| Benzene | 3.63 | 385 | 98.3 |
| n-Hexene | 3.76 | 387 | 96.6 |
| Diisopropylether | 3.70 | 388 | 99.7 |
| Cyclohexane | 3.50 | 376 | 94 |

*Example 7*

Polyoxypropylene glycol phenyl methyl ether was prepared from phenol, 1,2-propylene oxide, and methyl chloride according to the foregoing general procedure. In making the monoether, an equimolecular proportion of sodium to phenol was employed. The volume ratio of toluene to phenol was 5:1. During the preparation of the monoether, approximately 20 moles of propylene oxide per mole of phenol were used. The product data are contained in the table.

|  | Monoether | Diether |
|---|---|---|
| Viscosity: |  |  |
| 100° F. cks | 43.7 | 33.5 |
| 210° F. cks | 6.69 | 2.97 |
| Flash Point ° F. |  | 390 |
| Percent Hydroxyl |  | 2.75 |

*Example 8*

Polyoxybutylene glycol sec-butyl methyl ether was prepared from sec-butanol and 1,2-butylene oxide by the general procedure previously described. In reacting sodium with sec-butanol, an equimolecular proportion of sodium to alcohol was employed. The volume ratio of toluene to sec-butanol was about 5.5 to 1. In preparing the monoether, a mole ratio of 1,2-butylene oxide to sec-butanol of about 11 to 1 was used. The accompanying table contains the product data.

|  | Monoether | Diether |
|---|---|---|
| Viscosity: |  |  |
| 100° F. cks | 31.62 | 17.46 |
| 210° F. cks | 4.92 | 3.94 |
| Flash Point ° F. | 412 | 389 |
| Percent Hydroxyl | 3.17 | .13 |

*Example 9*

Polyoxypropylene glycol sec-butyl methyl ether was prepared according to the following general procedure employing fairly pure sodium sec-butylate as the starting material. The sodium sec-butylate was prepared by reacting sodium and excess sec-butanol in a large volume of toluene until all the sodium had reacted. Excess alcohol was then almost completely removed by azeotropic distillation with toluene. The sodium sec-butylate in toluene was then charged into a steel reaction vessel, heated to 140° C., and thereafter 1,2-propylene oxide was added until the desired amount had reacted. Following condensation with 1,2-propylene oxide, methyl chloride was passed into the total product until reaction was essentially complete. Physical properties of the diether are tabulated below:

Viscosity:
100° F _____ 11.81
210° F _____ 3.20
Flash point _____ ° F __ 370
Percent acidity (as acetic acid) _____ .009

What is claimed is:

1. The process for preparing alkali metal salts of monoethers of polyoxyalkylene glycols which consists essentially of reacting at least one compound of the class consisting of the 1,2-epoxides of ethylene, propylene, and butylene with the alkali metal salt of a monohydroxy compound of the class consisting of aliphatic alcohols and phenols having from 1 to 20 carbon atoms and containing only carbon, hydrogen, and oxygen in the molecule, with no functional group other than the hydroxy group attached thereto, said reaction being carried out under relatively moisture-free conditions in the temperature range of 60° to 200° C. by adding the 1,2-epoxy compound to a well-agitated solution of the alkali metal salt of the monohydroxy compound in a diluent which is relatively inert to both the alkali metal and the 1,2-epoxy compound until at least 5 moles of 1,2-epoxy compound have been added for each mole of the alkali metal salt of the monohydroxy compound.

2. The process for preparing sodium salts of monoethers of polyoxyalkylene glycols which consists essentially of reacting sodium with a monohydroxy compound of the class consisting of aliphatic alcohols and phenols having from 1 to 20 carbon atoms and containing only carbon, hydrogen, and oxygen in the molecule with no functional group other than the hydroxy group attached thereto, said reaction being carried out in a solution of a relatively inert diluent under essentially moisture-free conditions at a reaction temperature in the range of −10° to 150° C. employing greater than 0.8 atom of sodium per mole of the monohydroxy compound to form the sodium salt thereof, and thereafter maintaining the resultant solution with agitation at a reaction temperature in the range of 60° to 200° C. while gradually adding at least one essentially anhydrous compound of the class consisting of the 1,2-epoxides of ethylene, propylene, and butylene until at least 5 moles of 1,2-epoxy compound have been added for each mole of the sodium salt of the monohydroxy compound.

3. The process for preparing sodium salts of monoethers of polyoxyalkylene glycols which consists essentially of gradually adding to a well-agitated solution of sodium in a relatively inert diluent, approximately an equimolar proportion of a monohydroxy compound of the class consisting of aliphatic alcohols and phenols having from 1 to 20 carbon atoms and containing only carbon, hydrogen, and oxygen in the molecule, with no functional group other than the hydroxy group attached thereto, said addition being carried out under relatively moisture-free conditions at a reaction temperature in the range of about 100° to 150° C. to form the sodium salt of the monohydroxy compound, and thereafter maintaining the resultant solution with agitation at a reaction temperature in the range of 80° to 165° C. while gradually adding at least one essentially anhydrous compound of the class consisting of the 1,2-epoxides of ethylene, propylene, and butylene until at least 5 moles of 1,2-epoxy compound have been added for each mole of the sodium salt of the monohydroxy compound.

4. The process according to claim 3 wherein the monohydroxy compound is n-butanol and the 1,2-epoxy compound is 1,2-propylene oxide.

5. The process according to claim 3 wherein the monohydroxy compound is sec-butanol and the 1,2-epoxy compound is 1,2-propylene oxide.

6. The process according to claim 3 wherein the monohydroxy compound is sec-butanol and the 1,2-epoxy compound is 1,2-butylene oxide.

7. The process according to claim 3 wherein the total reaction product containing the sodium salt of the polyoxyalkylene glycol monoether is neutralized to form the corresponding polyoxyalkylene glycol monoether.

8. The process for preparing diethers of polyoxyalkylene glycols which consists essentially of adding to a well-agitated solution of sodium in a relatively inert diluent, a monohydroxy compound of the class consisting of aliphatic alcohols and phenols having from 1 to 20 carbon atoms and containing only carbon, hydrogen, and oxygen in the molecule, with no functional group other than the hydroxy group attached thereto, said addition being carried out under relatively moisture-free conditions at a reaction temperature in the range of about 100° to 150° C. until substantially all of the monohydroxy compound has been reacted with sodium to form the sodium salt thereof, maintaining the resultant solution with agitation at a reaction temperature in the range of 80° to 165° C. while adding at least one essentially anhydrous compound of the class consisting of the 1,2-epoxides of ethylene, propylene, and butylene until an average of at least 5 mole proportions of 1,2-epoxy compound have been reacted with each mole of the sodium salt of the monohydroxy compound to form the sodium salt of a polyoxyalkylene glycol monoether, and thereafter mixing an alkyl halide with the reaction product containing the sodium salt of the polyoxyalkylene glycol monoether maintained at a reaction temperature in the range of 60° to 160° C. until substantially all of the sodium atoms attached to the polyoxyalkylene glycol compound have reacted with the alkyl halide.

9. The process for preparing the n-butyl methyl diether of polyoxypropylene glycol according to claim 8 wherein the monohydroxy compound is n-butanol, the 1,2-epoxide is 1,2-propylene oxide, and the alkyl halide is methyl chloride.

10. The process for preparing the sec-butyl methyl diether of polyoxypropylene glycol according to claim 8 wherein the monohydroxy compound is sec-butanol, the 1,2-epoxide is 1,2-propylene oxide, and the alkyl halide is methyl chloride.

11. The process for preparing the sec-butyl methyl diether of polyoxybutylene glycol wherein the monohydroxy compound is sec-butanol, the 1,2-epoxide is 1,2-butylene oxide, and the alkyl halide is methyl chloride.

12. The process for preparing the phenyl methyl diether of polyoxypropylene glycol according to claim 8 wherein the monohydroxy compound is phenol, the 1,2-epoxide is 1,2-propylene oxide, and the alkyl halide is methyl chloride.

13. In a process for preparing an ether of a polyoxyalkylene glycol by reacting (1) one mole of a monohydroxy compound of the class consisting of aliphatic alcohols and phenols having from 1 to 20 carbon atoms and containing only carbon, hydrogen, and oxygen in the molecule, with no functional group other than the hydroxy group attached thereto, with (2) at least 5 moles of at least one essentially anhydrous compound of the class consisting of the 1,2-epoxides of ethylene, propylene, and butylene at a temperature in the range of 80° to 165° C., the improvement which consists in first converting the monohydroxy compound mainly to the sodium salt thereof by reacting it with at least 0.8 mole of sodium per mole of the monohydroxy compound in the presence of a relatively inert diluent prior to the addition of epoxide.

14. In a process for preparing a diether of a polyoxyalkylene glycol by reacting (1) one mole of a monohydroxy compound of the class consisting of aliphatic alcohols and phenols having from 1 to 20 carbon atoms and containing only carbon, hydrogen, and oxygen in the molecule, with no functional group other than the hydroxy group attached thereto with (2) at least 5 moles of at least one essentially anhydrous compound of the class consisting of the 1,2-epoxides of ethylene, propylene, and butylene at a temperature in the range of 80° to 165° C., and the resultant product is then condensed with an alkyl halide, the improvement which consists in first converting the monohydroxy compound mainly to the sodium salt thereof by reacting it with at least 0.8 mole of sodium per mole of the monohydroxy compound in the presence of a relatively inert diluent prior to the addition of epoxide, and thereafter gradually introducing an alkyl halide into the entire product of the first step maintained with agitation at a reaction temperature in the range of 60° to 160° C. until reaction ceases.

References Cited in the file of this patent
UNITED STATES PATENTS

| | | |
|---|---|---|
| 2,133,480 | Schoeller et al. | Oct. 18, 1938 |
| 2,174,761 | Schuette et al. | Oct. 3, 1939 |
| 2,327,053 | Marple et al. | Aug. 17, 1943 |
| 2,355,823 | Schlegel | Aug. 15, 1944 |
| 2,425,755 | Roberts et al. | Aug. 19, 1947 |
| 2,448,664 | Fife et al. | Sept. 7, 1948 |
| 2,677,700 | Jackson et al. | May 4, 1954 |

OTHER REFERENCES

Organic Chemistry (Richter), published by P. Blakiston's Son & Company, Philadelphia, Pa., 1921 (page 117 relied on).

Organic Chemistry (Richter), published by P. Blakiston's Son & Company, Philadelphia, Pa., 1922 (page 186 relied on).